June 20, 1933.  J. E. LE FEVER  1,914,696

LOCK NUT

Original Filed Aug. 2, 1930

INVENTOR.
John E. LeFever

BY Lancaster, Allwine & Rommel
ATTORNEYS.

Patented June 20, 1933

1,914,696

UNITED STATES PATENT OFFICE

JOHN ELMER LE FEVER, OF TIONAGA, ONTARIO, CANADA

LOCK NUT

Application filed August 2, 1930, Serial No. 472,668. Renewed April 12, 1933.

The present invention relates to improvements in lock nuts and the primary object of the invention is to provide an improved lock nut combination whereby the nut may be securely locked at any position of rotation and in binding engagement with the work.

A further object of the invention is to provide a lock nut combination wherein three points of gripping action will be formed thru tightening of the nut and preventing loosening of the nut due to vibration.

A further object resides in the novel arrangement whereby a locking action is formed between the nut and the bolt and also upon the work.

A still further object is to provide a lock nut having a construction permitting use of ordinary socket wrenches for tightening or loosening of the nut.

A further object of the invention resides in the novel construction of the locking ring or washer and the nut which engages the washer in such manner as to contract the washer into gripping engagement with the bolt.

Other objects and advantages of the invention will be apparent during the course of the following detailed description, taken in connection with the accompanying drawing forming a part of this specification and in which drawing.

Figure 1:
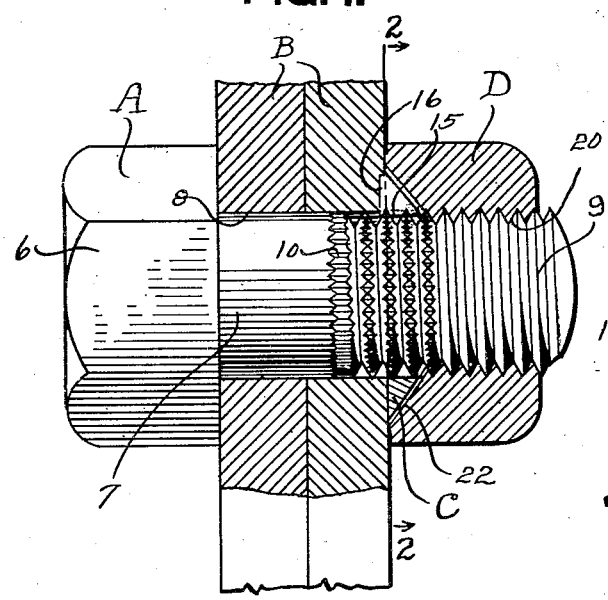
Figure 1 is a view part in section and part in elevation showing the improved lock nut in use.
Figure 2:
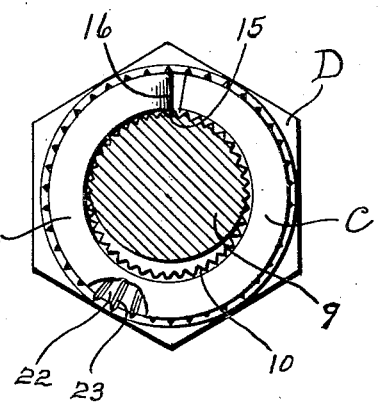
Figure 2 is a section on line 2—2 of Figure 1.

Referring to the drawing in detail, and wherein similar reference characters designate corresponding parts thruout the several views, the letter A designates a bolt or other screw threaded element, B elements thru which the bolt A projects, C a locking ring or washer of improved construction and D a nut having threaded engagement upon the bolt A into operative relation with the locking ring C in a manner to prevent counter rotation of the nut due to vibration.

The bolt A includes the head 6 and a shank 7 which is shown extended thru aligning openings 8 in the elements B. The shank 7 is provided with a threaded end portion 9. Preferably provided along the inner portion of the threaded end 9 is a series of longitudinally extending grooves 10 which are arranged in parallel relation circumferentially of the bolt shank. These grooves 10 are preferably formed by a knurling operation and are preferably relatively shallow and in some instances may be dispensed with entirely.

Figure 3:
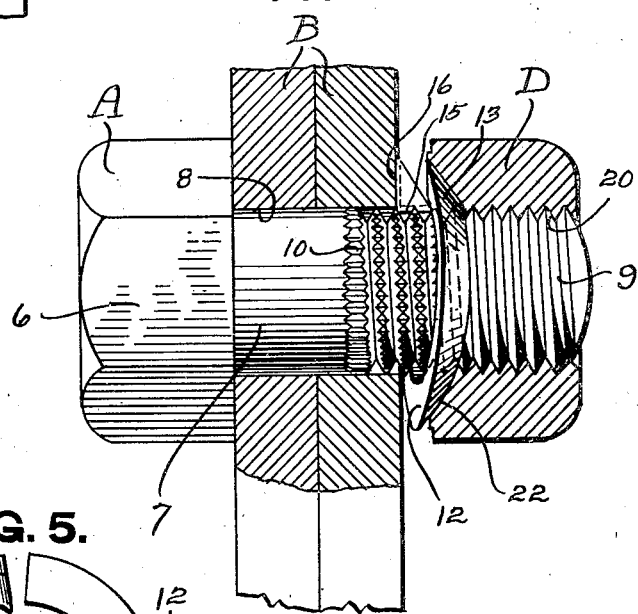
Figure 3 is a view part in section and part in elevation showing the nut in a partially tight position upon the bolt shank.
Figure 4:
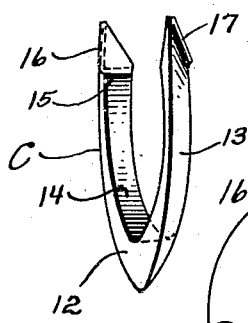
Figure 4 is a perspective view of the locking ring or washer.
Figure 5:
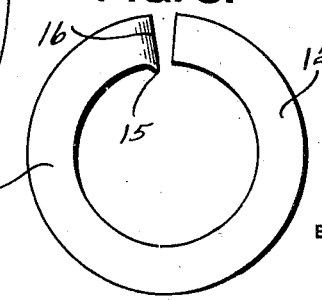
Figure 5 is a plan view looking at the flat work engaging side of the locking ring or washer.

The locking ring or washer C is of split spiral formation and of triangular shape in cross section providing a flat rear face 12 and a beveled front face 13. Provided at one end of the flat inner ring face 14 is a rib 15 which at its rear end connects with the inner end of a radially extending rib 16 provided at one end of the rear face 12. Provided at the opposite end of the locking ring, along the beveled front face 13 is a forwardly extending rib 17 which also extends in a substantially radial direction. The internal diameter of the ring C when in its normal condition as shown in Figures 3, 4 and 5 is slightly greater than the diameter of the bolt shank 7 and the ring is intended to be slightly contracted by a cam action upon tightening of the nut D. The ribs 15, 16 and 17 may be termed bolt, work and nut engaging ribs respectively since these ribs, when the nut D is tightened, are respectively embedded in the elements A, B and C.

The nut may be of hexagonal shape and provided with a threaded bore 20 for threading upon the threaded shank portion 9. The inner or base end of the nut is chamfered providing a frusto-conical ring seat 22 provided with a series of radially arranged grooves 23. This frusto-conical ring seat 22 is of a depth substantially equal to the thickness of the ring seat so that when the nut is threaded upon the shank 7 the ring seat will act with a cam action for reducing the diameter of the locking ring.

In use of the improved lock nut, the locking ring or washer is placed over the threaded shank portion 9 with the flat rear face of the ring confronting the work thru which the bolt 10 projects. The nut D may then be turned upon the threads 9 until the ring seat 22 engages the beveled front face 13 of the locking ring and continued rotating of the nut will contract the locking ring about the bolt 10 and at the same time move the spirally offset ends of the ring into alignment. As the nut is forced tight, the radial rib 16 will be embedded in the work B and contracting of the ring will move the rib 15 into one of the longitudinally formed grooves 10 provided in the bolt shank. As the nut is being rotated, the grooves 23 will ride past the inclined rib 17 and permit the nut to be turned to any desired tight condition. Owing to the spring action of the ring C, the nut D will be held against counter rotation due to vibration, altho if found necessary, the nut may be backed off by applying considerable force to a wrench placed over the nut.

Thus it will be seen that when the nut D is forced down upon the work B that three separate gripping points are formed, locking the bolt against rotation in the work, locking the ring against rotation, and locking the nut to the ring. During tightening of the nut D, the rib 17 will act with a ratchet effect upon the radially grooved ring seat 22 and allow the nut to be tightened to any desired degree. Thus the nut D need not be tightened to such an extent to possibly cause injury to the threads and yet allow for the nut to be held against accidental displacement.

While it is preferred that the bolt shank 7 and inner end of the nut D be knurled to provide the grooves for receiving the ribs of the locking ring, these grooves may be dispensed with and the three point gripping of the locking ring provided by allowing the ribs 16 and 17 to become embedded in the bolt shank and nut thru tightening of the nut.

Thus it will be seen that an improved type of lock nut has been provided embodying an arrangement which may be embodied in all sizes of bolts and nuts, and which may be constructed at a cost considerably less than the types employing a cotter pin and castle nut. With the present type of split lock washers, any severe vibration has a tendency to allow the nut to loosen since the locking action is between the nut and the work and not between the nut and the bolt as is the case with the improved lock nut arrangement as herein disclosed. Since with the usual forms of split lock washers, the lock is between the nut and the work, the locking action is not very efficient even on uncase hardened nuts and bolts since the bolt is permitted to work loose, and with case hardened nuts and bolts, the present forms of lock washers provide little effect as a lock.

Changes in detail may be made to the form of invention herein shown and described, without departing from the spirit of the invention or the scope of the following claim.

I claim:

In combination, a bolt including a threaded shank provided with a longitudinally fluted portion, a split locking ring of spiral formation encircling the fluted shank portion and provided with a beveled outer face, an inwardly extending rib at one end of the ring, a rib extending across the outer beveled face at the opposite end of the ring, and a nut threaded upon the bolt shank, having a conical ring seat at its inner end engageable with the beveled outer face of the locking ring, said ring seat provided with a plurality of radial grooves any one of which engageable by said second mentioned rib.

JOHN ELMER LE FEVER.